United States Patent
Wu et al.

(10) Patent No.: US 12,386,762 B2
(45) Date of Patent: Aug. 12, 2025

(54) ADDRESS CONVERSION SYSTEM AND ADDRESS CONVERSION METHOD

(71) Applicant: Realtek Semiconductor Corporation, Hsinchu (TW)

(72) Inventors: Kuo-Jung Wu, Hsinchu (TW); Yi-Cheng Chen, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 196 days.

(21) Appl. No.: 18/320,185

(22) Filed: May 18, 2023

(65) Prior Publication Data

US 2024/0104032 A1 Mar. 28, 2024

(30) Foreign Application Priority Data

Sep. 28, 2022 (TW) .................................. 111136841

(51) Int. Cl.
*G06F 13/16* (2006.01)
*G06F 13/40* (2006.01)

(52) U.S. Cl.
CPC ...... *G06F 13/1673* (2013.01); *G06F 13/4068* (2013.01)

(58) Field of Classification Search
None
See application file for complete search history.

(56) References Cited

U.S. PATENT DOCUMENTS

| | | | |
|---|---|---|---|
| 7,995,759 B1 * | 8/2011 | Tolfmans | H04L 9/065 707/808 |
| 8,015,383 B2 * | 9/2011 | Shultz | G06F 12/0284 711/134 |
| 8,532,192 B2 * | 9/2013 | Persson | H04N 19/61 375/240.18 |
| 9,069,669 B2 * | 6/2015 | Li | G06F 9/455 |
| 2008/0109592 A1 * | 5/2008 | Karamcheti | G06F 12/1009 711/E12.008 |
| 2016/0239209 A1 * | 8/2016 | Malyugin | G06F 3/0673 |

FOREIGN PATENT DOCUMENTS

TW 201435585 A 9/2014
TW 202225983 A 7/2022

* cited by examiner

*Primary Examiner* — Elias Mamo
(74) *Attorney, Agent, or Firm* — CKC & Partners Co., LLC (57) ABSTRACT

The address conversion system includes a storage device, a memory bus, and a processor. The processor is configured to execute the following steps: generating a real buffer on the storage device; generating a fake buffer in a fake capacity of the storage device by a fake buffer algorithm; establishing a coupling relationship between the real buffer and the fake buffer through a coupling algorithm by the coupler of the memory bus; receiving a compressed data from a first device by the real buffer; when a second device wants to read the fake buffer, the coupler guides the second device to the real buffer through the coupling relationship for reading; transmitting the compressed data of the real buffer to the coupler by the memory bus; decompressing the compressed data into a decompressed data by the coupler; and transmitting the decompressed data to the second device by the memory bus.

20 Claims, 6 Drawing Sheets

ADDRESS CONVERSION SYSTEM AND ADDRESS CONVERSION METHOD

CROSS-REFERENCE TO RELATED APPLICATION

This application claims priority to Taiwan Application Serial Number 111136841, filed Sep. 28, 2022, which is herein incorporated by reference in its entirety.

BACKGROUND

Field of Invention

The present invention relates to a conversion system and conversion method. More particularly, the present invention relates to an address conversion system and address conversion method.

Description of Related Art

At present, data transmission between hardware (or components) on a SOC (System on a Chip) needs to use a buffer set in a memory as an intermediate data transmission role, and use other devices to assist in data compression and decompression, so that two components with different addresses can transmit data smoothly. However, two different components usually need to be equipped with two buffers, but the two buffers will consume resources in the memory, resulting in a waste of resources. When the two different components transmit data, it is easy to cause resource consumption in the memory.

SUMMARY

The present disclosure provides an address conversion system. The address conversion system comprises a storage device, a memory bus, and a processor. The memory bus is configured to couple a first device to a second device. The processor is configured to access and execute a plurality of commands of the storage device to: generate a real buffer in the storage device; generate a fake buffer in a fake capacity of the storage device by a fake buffer algorithm; establish a coupling relationship between the real buffer and the fake buffer through a coupling algorithm by the coupler of the memory bus; receive a compressed data from the first device by the real buffer; when the second device wants to read the fake buffer, the coupler guides the second device to the real buffer through the coupling relationship for reading; transmit the compressed data of the real buffer to the coupler by the memory bus; decompress the compressed data into a decompressed data by the coupler; and transmit the decompressed data to the second device by the memory bus.

The present disclosure provides an address conversion method. The address conversion method comprises following steps: generating a real buffer in a storage device; generating a fake buffer in a fake capacity of the storage device by a fake buffer algorithm; establishing a coupling relationship between the real buffer and the fake buffer through a coupling algorithm by a coupler of a memory bus; receiving a compressed data from a first device by the real buffer; when a second device wants to read the fake buffer, the coupler guides the second device to the real buffer through the coupling relationship for reading; transmitting the compressed data of the real buffer to the coupler by the memory bus; decompressing the compressed data into a decompressed data by the coupler; and transmitting the decompressed data to the second device by the memory bus.

Therefore, based on the technical content of the present disclosure, the address conversion system and the address conversion method shown in the embodiment of the present disclosure can reduce the consumption of resources in the memory, so as to achieve the effect of transferring data between two pieces of hardware with different addresses.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

In accordance with usual practice, the various features and elements in the figures are not drawn to scale, but are drawn in order to best present specific features and elements relevant to the present disclosure. In addition, between different drawings, the same or similar element symbols are used to refer to similar elements/components.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Various embodiments of the present technology are discussed in detail below with figures. It should be understood that the details should not limit the present disclosure. In other words, in some embodiments of the present disclosure, the details are not necessary. In addition, for simplification of figures, some known and commonly used structures and elements are illustrated simply in figures.

In the present disclosure, "connected" or "coupled" may refer to "electrically connected" or "electrically coupled." "Connected" or "coupled" may also refer to operations or actions between two or more elements.

Figure 1:
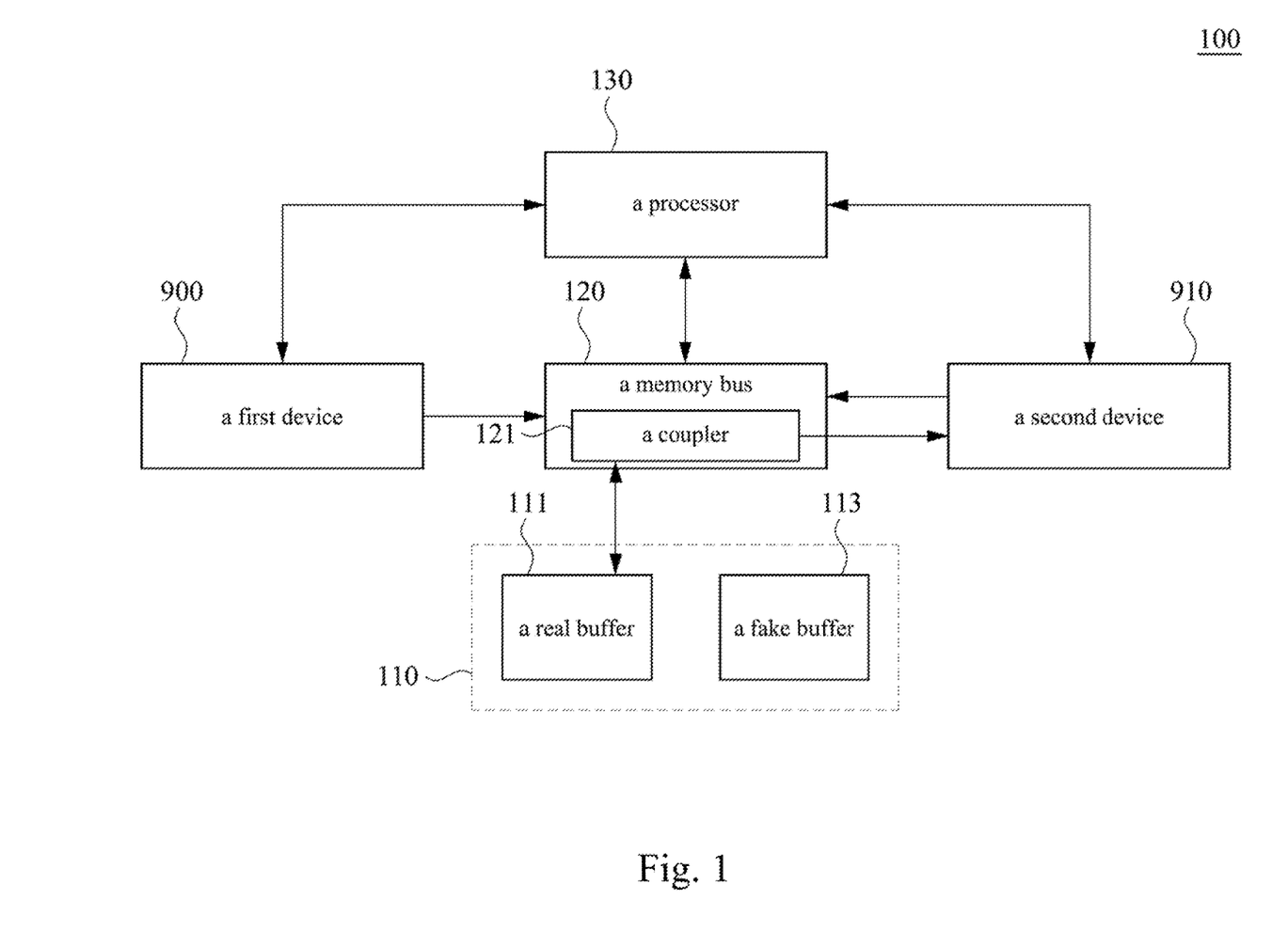
FIG. 1 is a block diagram of an address conversion system according to one embodiment of the present disclosure.

FIG. 1 is a block diagram of an address conversion system according to one embodiment of the present disclosure. As shown in FIG. 1, the address conversion system 100 includes a storage device 110, a memory bus 120, and a processor 130. In connection relationship, the storage device 110 is coupled to the memory bus 120, and the memory bus 120 is coupled to the processor 130.

In order to reduce the consumption of resources in the memory, so as to achieve the effect of transferring data between two pieces of hardware with different addresses, the present disclosure provides the address conversion system 100 as shown in FIG. 1, and the detailed description of its related operations is as shown below.

In one embodiment, a coupler 121 of memory bus 120 is configured to couple a first device 900 to a second device 910. In one embodiment, the processor 130 is configured to access and execute a plurality of commands of the storage device 110 to: generate a real buffer 111 in the storage device 110; generate a fake buffer 113 in a fake capacity of the storage device 110 by a fake buffer algorithm; establish a coupling relationship between the real buffer 111 and the fake buffer 113 through a coupling algorithm by the coupler 121 of the memory bus 120; receive a compressed data from the first device 900 by the real buffer 111; when the second device 910 wants to read the fake buffer 113, the coupler 121 guides the second device 910 to the real buffer 111 through the coupling relationship for reading; transmit the compressed data of the real buffer 111 to the coupler 121 by the memory bus 120; decompress the compressed data into a decompressed data by the coupler 121; and transmit the decompressed data to the second device 910 by the memory bus 120.

Figure 2:
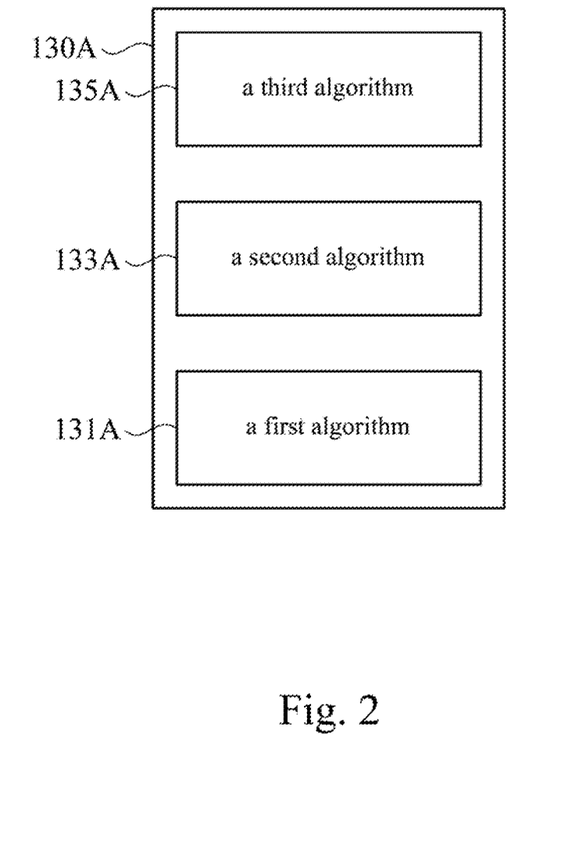
FIG. 2 is a block diagram of a processor of an address conversion system according to one embodiment of the present disclosure.

In order to make the above operations of the address conversion system 100 easy to understand, please refer to FIG. 1 and FIG. 2. FIG. 2 is a block diagram of a processor of an address conversion system according to one embodiment of the present disclosure.

Please refer to FIG. 1, in operation, in one embodiment, the coupler 121 of the memory bus 120 is configured to couple the first device 900 to the second device 910. For example, the coupler 121 of the memory bus 120 can map, bind, or couple the first device 900 to the second device 910. In some embodiments, first device 900 can include an address, the second device 910 can include an another address, and the coupler 121 of the memory bus 120 can map, bind, or couple the address of first device 900 to the another address of the second device 910, but the present disclosure is not limited to this embodiment.

In addition, in some embodiments, the first device 900 can be an in-house product (such as an in-house IP), that is, a component produced by an in-house company. Otherwise, the first device 900 can also be a video decoder. The second device 910 can be an outsourced product (such as a Vendor IP), that is, a component produced by outsourcing other company. Otherwise, the second device 910 can also be a graphics processing unit (GPU), but the present disclosure is not limited to this embodiment. In some embodiments, the first device 900 and the second device 910 can be located on a system on a chip (SOC), but the present disclosure is not limited to this embodiment. In some embodiments, first device 900 can also be the graphics processing unit (GPU), the second device 910 can also be the video decoder, and the memory bus 120 can have a design or a function for decompressing data in the graphics processing unit, but the present disclosure is not limited to this embodiment.

In some embodiments, the processor 130 is configured to access and execute a plurality of commands of the storage device 110 to: generate a real buffer 111 in the storage device 110. For example, the storage device 110 can be a double data rate synchronous dynamic random access memory (DDR SDRAM, hereinafter referred to as DDR) with a capacity of 4 GB, the real buffer 111 can be located in 0~4 GB of the storage device 110, in other words, the resources that the real buffer 111 can use are 0~4 GB, but the present disclosure is not limited to this embodiment.

Please refer to FIG. 2, in one embodiment, the processor 130 can include a memory allocator, and generate a real buffer 111 and a fake buffer 113 on the storage device 110, but the present disclosure is not limited to this embodiment. In some embodiments, the memory allocator 130 can be a third algorithm 135A (such as a RXX dvrMemory Manager algorithm, as shown in FIG. 2), and the third algorithm 135A (such as a RXX dvrMemory Manager algorithm) can be a software which is developed by a RXX semiconductor company and based on a Linux operating system, but the present disclosure is not limited to this embodiment.

Then, the processor 130 generates the fake buffer 113 in a fake capacity of the storage device 110 by a fake buffer algorithm. For example, the fake buffer algorithm can be a first algorithm 131A (such as a Linux kernel algorithm, as shown in FIG. 2), the fake capacity can be a fake address space, and the fake buffer 113 can be a sparse memory block 113. In other words, the processor 130 can register the sparse memory block 113 in the first algorithm 131A (such as the Linux kernel algorithm), but the present disclosure is not limited to this embodiment.

In some embodiments, a total capacity of the storage device 110 can be 4 GB, the real buffer 111 can be a Buffer 1, the fake buffer 113 can be a Buffer 2, and the Buffer 2 can be the sparse memory block 113. The processor 130 can generate the fake address space in the storage device 110 by the fake buffer algorithm, the Buffer 1 can use 0~4 GB area of storage device 110, and the sparse memory block 113 uses 4~5 GB area (for the storage device 110, the 4~5 GB area does not actually exist) in the fake address space. However, the sparse memory block 113 has a characteristic of a kernel pages structure, for the second device 910, the sparse memory block 113 can regarded as a physical memory, but the present disclosure is not limited to this embodiment. Therefore, the address conversion system 100 does not need to increase a hardware (for example, an additional memory capacity) or resources for coupling the first device 900 to the second device 910.

In some embodiments, the real buffer 111 can be the Buffer 1, the fake buffer 113 can be the Buffer 2, and a total number of the Buffer 1 and Buffer 2 can be 12 pieces. Of course, the total number of the Buffer 1 and Buffer 2 can be more or less, but the present disclosure is not limited to this embodiment.

Afterward, establishing a coupling relationship between the real buffer 111 and the fake buffer 113 through a coupling algorithm by the coupler 121 of the memory bus 120. For example, the memory bus 120 can include a coupler 121, and the coupler 121 can couple a first address of the real buffer 111 to a second address of the fake buffer 113 by the coupling algorithm, but the present disclosure is not limited to this embodiment. In some embodiments, the coupler 121 can monitor whether an incoming address is a address of the fake buffer 113, and the coupler 121 can also set (or establish) a coupling relationship between the real buffer 111 and the fake buffer 113, but the present disclosure is not limited to this embodiment.

Then, receiving a compressed data from the first device 900 by the real buffer 111. For example, the first device 900 can be an In-house IP 900, the In-house IP 900 can output the compressed data, and the compressed data can be written to the real buffer 111, but the present disclosure is not limited to this embodiment.

Afterward, when the second device 910 wants to read the fake buffer 113, the coupler 121 guides the second device 910 to the real buffer 111 through the coupling relationship for reading. For example, the second device 910 can be a Vendor IP 910, and memory bus 120 can include the coupler 121. When the Vendor IP 910 wants to read the fake buffer 113, the coupler 121 can guide the Vendor IP 910 to the real buffer 111 through the coupling relationship for reading, but the present disclosure is not limited to this embodiment.

Subsequently, transmitting the compressed data of the real buffer 111 to the coupler 121 by the memory bus 120. Then, decompressing the compressed data into a decompressed data by the coupler 121. Afterward, transmitting the decompressed data to the second device 910 by the memory bus 120. For example, the real buffer 111 can transmit the compressed data to the coupler 121, after the coupler 121 receiving the compressed data, the coupler 121 can decompress the compressed data into the decompressed data. Then, the memory bus 120 transmits the decompressed data to the second device 910, but the present disclosure is not limited to this embodiment.

In some embodiments, the processor 130 is further configured to access and execute the plurality of commands of the storage device 110 to: transmit a generating buffer command by the first device 900; and generate the real buffer 111 in the storage device 110 through a buffer algorithm according to the generating buffer command. For example, the real buffer 111 can be the Buffer 1, the generating buffer command can be a request output Buffer command, but the present disclosure is not limited to this embodiment.

In some embodiments, processor 130 is further configured to access and execute the plurality of commands of the storage device 110 to: transmit a returning buffer command to the first device 900; and transmit a generating fake buffer command by the second device 910. For example, the returning buffer command can be a return Buffer 1 command, the generating fake buffer command can be a request input Buffer command, but the present disclosure is not limited to this embodiment.

In some embodiments, the processor 130 is further configured to access and execute the plurality of commands of the storage device 110 to: generate the fake buffer 113 in the fake capacity of the storage device 110 through the fake buffer algorithm according to the generating fake buffer command. For example, the processor 130 can generate the fake buffer 113 (such as the Buffer 2) in the fake capacity (such as the fake address space) of the storage device 110 through the fake buffer algorithm (such as the Linux kernel algorithm) according to the generating fake buffer command (such as the request input Buffer command), but the present disclosure is not limited to this embodiment.

In some embodiments, the processor 130 is further configured to access and execute the plurality of commands of the storage device 110 to: output a coupling command to the coupler 121 of the memory bus 120; and couple a first address of the real buffer 111 to a second address of the fake buffer 113 through the coupling algorithm by the coupler 121 according to the coupling command. For example, the coupling command can be an allocate fake Buffer 2 command, the coupling command writes to the coupler 121 (such as the MonitorWrapper 121) of the memory bus 120, and the coupler 121 is configured to map, bind, or couple the second address of the fake buffer 113 (such as the Buffer 2) to the first address of the real buffer 111 (such as the Buffer 1), but the present disclosure is not limited to this embodiment.

In some embodiments, the coupling algorithm is configured to inspect an address (such as a read address) of the second device 910 in real-time by the coupler 121. When the read address is located on the second address (for example, the second address is between a start address and an end address of the second buffer (such as the Buffer 2)) of the fake buffer 113, a first translator (such as a Level-0 address translator) is performed on the read address to translate the read address to a corresponding address (such as a Buffer1_read_address) of the Buffer 1.

Then, a second translator (such as a Level-1 translator) is performed on the Buffer1_read_address to obtain a corresponding data offset (such as a Buffer1_offset_address) and first cache (such as a header cache) of the Buffer 1. In addition, the first cache (such as the header cache) can generate a second cache (such as a Decompressor/data cache).

Afterward, after an interface (such as a DDR interface) of the storage device 110 receives the Buffer1_offset_address and the Decompressor/data cache, the DDR interface drives the coupler 121 to decompress the compressed data of the first device 900 (such as the in-house IP) into the decompressed data. Then, the coupler 121 transmits the decompressed data to the second device 910 (such as the Vendor IP), but the present disclosure is not limited to this embodiment.

In some embodiments, the processor 130 is further configured to access and execute the plurality of commands of the storage device 110 to: transmit the returning fake buffer command to the second device 910. For example, the returning fake buffer command can be a return Buffer 2 command, but the present disclosure is not limited to this embodiment.

In some embodiments, the processor 130 is further configured to access and execute the plurality of commands of the storage device 110 to: transmit the compressed data to the real buffer 111 by the first device 900 according to the returning buffer command. For example, the first device 900 can transmit the compressed data to the Buffer 1 according to the return Buffer 1 command, but the present disclosure is not limited to this embodiment.

In some embodiments, the processor 130 is further configured to access and execute the plurality of commands of the storage device 110 to: transmit a reading data command to the memory bus 120 by the second device 910 according to the returning fake buffer command; and confirm whether a fake reading data command is received from the second device by the coupler 121. For example, the reading data command can be a read data from Buffer 2 command, the fake reading data command can be a faked read trigger command, and the second device 910 can transmit the read data from Buffer 2 command to the memory bus 120 according to the return Buffer 2 command. The coupler 121 can further identify whether the read data from Buffer 2 command output from the second device 910 is the faked read trigger command, but the present disclosure is not limited to this embodiment. In some embodiments, the coupler 121 determines the read address sent by the second device 910. As long as the read address falls within the range of buffer 2 address, the read address will transfer to the read buffer 1, but the present disclosure is not limited to this embodiment.

In some embodiments, the processor 130 is further configured to access and execute the plurality of commands of the storage device 110 to: transmit a reading buffer command to the real buffer 111 when it is confirmed that the fake reading data command is received from the second device 910 by the coupler 121; and transmit the compressed data to the coupler 121 according to the reading buffer command by the real buffer 111. For example, the reading buffer command can be a request read from Buffer 1 command, the coupler 121 can identify the read data from Buffer 2 command outputted from the second device 910 is the faked read trigger command, and the coupler 121 can then transmit the request read from Buffer 1 command to the real buffer 111. The real buffer 111 transmits the compressed data to the coupler 121 according to the request read from Buffer 1 command. Then, coupler 121 can decompress the compressed data into the decompressed data. Afterward, the memory bus 120 can transmit the decompressed data to the second device 910, but the present disclosure is not limited to this embodiment. In some embodiments, "transmit a reading buffer command to the real buffer 111" can be "transmit a reading buffer command where the reading address equal to the address of the real buffer 111", but the present disclosure is not limited to this embodiment. In some embodiments, "transmit the compressed data to the coupler 121 according to the reading buffer command by the real buffer 111" can be "get the compressed data from the real buffer 111 to the coupler 121 via the memory bus 120 according to the reading buffer command to the real buffer 111", but the present disclosure is not limited to this embodiment.

In some embodiments, the fake buffer algorithm includes a Linux algorithm, and the coupler 121 includes a decompressor. For example, the fake buffer algorithm can be an algorithm technique associated with the first algorithm 131A (such as the Linux kernel, as shown in FIG. 2), the decompressor can be a decompressor on any entity or software, and the coupler 121 can include the MonitorWrapper and the decompressor, but the present disclosure is not limited to this embodiment.

Please refer to FIG. 2, in some embodiments, the processor 130 includes a plurality of algorithm. For example, the processor 130 can include the first algorithm 131A, a second algorithm 133A, and a third algorithm 135A. The first algorithm 131A can be Linux kernel pages algorithm, the second algorithm 133A can be a sparse memory algorithm, and the third algorithm 135A can be a RXX dvrMemory Manager algorithm. The RXX dvrMemory Manager algorithm can be the software which is developed by the RXX semiconductor company and based on a Linux operating system. In other words, the RXX dvrMemory Manager algorithm can use a sparse memory technology of a Linux kernel for a bottom layer and a memory management mode developed by the RXX semiconductor company, but the present disclosure is not limited to this embodiment.

In some embodiments, the storage device 110 can include the first algorithm 131A, the second algorithm 133A, and the third algorithm 135A (not shown in the figure). For example, the first algorithm 131A can be the Linux kernel pages algorithm, the second algorithm 133A can be the sparse memory algorithm, the third algorithm 135A can be the RXX dvrMemory Manager algorithm, but the present disclosure is not limited to this embodiment.

In some embodiments, the effect of reducing the size of the real buffer 111 is achieved by using the fake buffer 113 in the present disclosure. For example, a size of the fake buffer 113 (such as the Buffer 2) can be width×height, a size of real buffer 111 (such as the Buffer 1) of the storage device 110 can be reduction ratio×width×height, and the reduction ratio can be 50%. The reduction ratio can be related to a compression rate of the first device 900 (such as the In-house IP 900), but the present disclosure is not limited to this embodiment.

In some embodiments, a buffer of a conventional memory has a first size, the real buffer 111 (such as the Buffer 1) in the present disclosure has a second size, and the second size is smaller than the first size. For example, through a fake buffer creation technology in the present, an effect of effectively reducing a buffer size can be achieved. In some embodiments, the second device 910 (such as the Vendor IP 910) reads/writes a command by the fake buffer 113, and the second device 910 (such as the Vendor IP 910) can think what it reads is a complete buffer size, rather than a compressed size in the real buffer 111 (such as the Buffer 1), but the present disclosure is not limited to this embodiment.

In some embodiments, the coupler 121 can have a function of a level 1 address translation, without a mechanism of processing the fake buffer 113 (such as the Buffer 2). Furthermore, a buffer size and a buffer address read by the first device 900 (such as the In-house IP 900) and the second device 910 (such as the Vendor IP 910) can be the same. That is, for the first device 900 (such as the In-house IP 900) and the second device 910 (such as the Vendor IP 910), a memory size occupied by the real buffer 111 (such as the Buffer 1) of the storage device 110 is equivalent to a size of the fake buffer 113 (such as the Buffer 2) and cannot be reduced, but the present disclosure is not limited to this embodiment.

Figure 3:
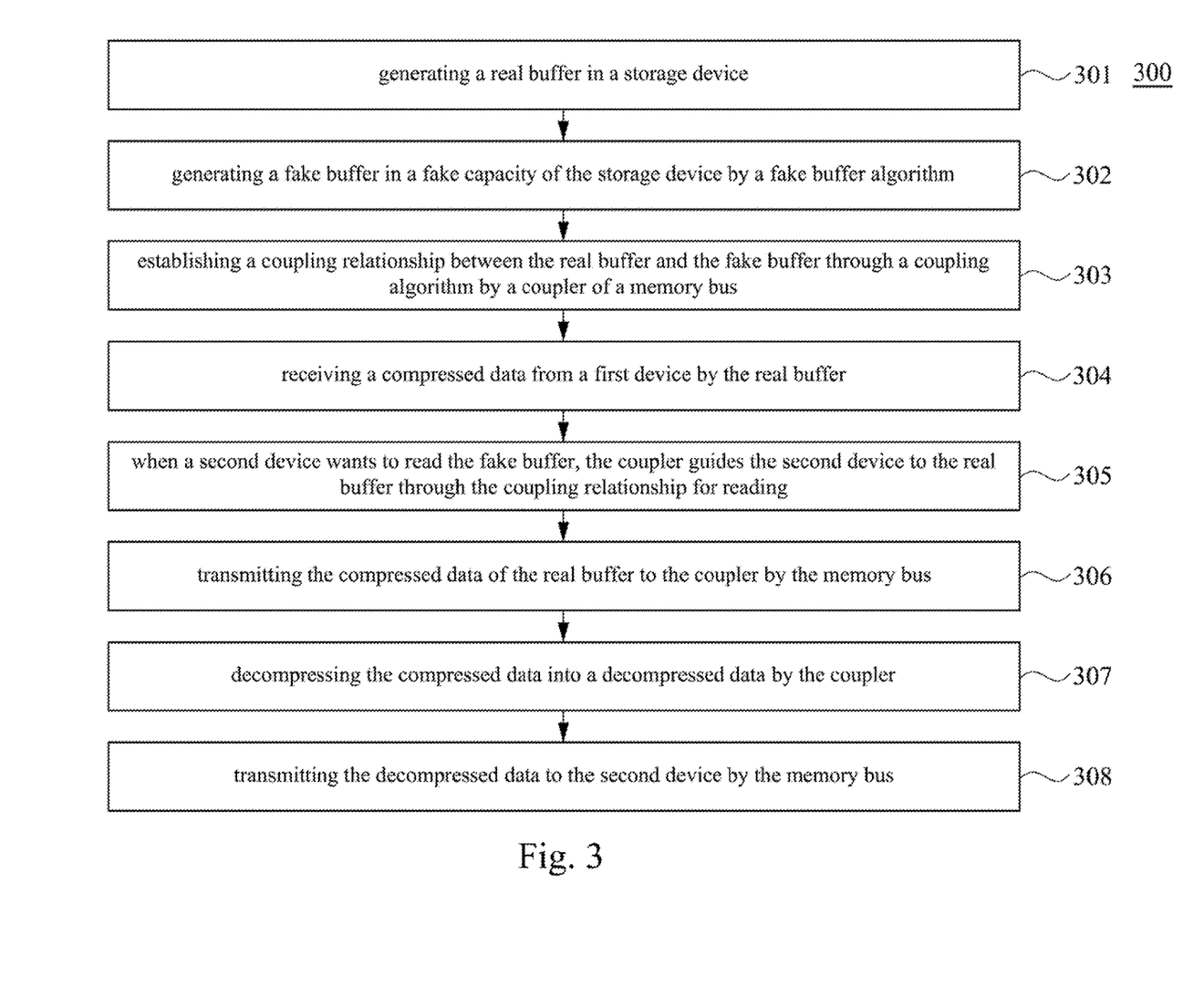
FIG. 3 is a flowchart of an address conversion method according to one embodiment of the present disclosure.

FIG. 3 is a flowchart of an address conversion method according to one embodiment of the present disclosure. In order to make the address conversion method 300 of FIG. 3 easier to understand, please refer to FIG. 1 and FIG. 3. The address conversion method 300 of FIG. 3 includes the following steps:

Step 301: generating a real buffer 111 in a storage device 110;

Step 302: generating a fake buffer 113 in a fake capacity of the storage device 110 by a fake buffer algorithm;

Step 303: establishing a coupling relationship between the real buffer 111 and the fake buffer 113 through a coupling algorithm by a coupler 121 of a memory bus 120;

Step 304: receiving a compressed data from a first device 900 by the real buffer 111;

Step 305: when a second device 910 wants to read the fake buffer 113, the coupler 121 guides the second device 910 to the real buffer 111 through the coupling relationship for reading;

Step 306: transmitting the compressed data of the real buffer 111 to the coupler 121 by the memory bus 120;

Step 307: decompressing the compressed data into a decompressed data by the coupler 121;

Step 308: transmitting the decompressed data to the second device by the memory bus 120.

In one embodiment, please refer to step 301, the processor 130 generates the real buffer 111 on the storage device 110. For example, the storage device 110 can be the double data rate synchronous dynamic random access memory (DDR SDRAM, hereinafter referred to as DDR) with the capacity of 4 GB, the real buffer 111 can be located in 0~4 GB of the storage device 110, in other words, the resources that the real buffer 111 can use are 0~4 GB, but the present disclosure is not limited to this embodiment.

Please refer to FIG. 2, in one embodiment, the processor 130 can include the memory allocator, and generate the real buffer 111 and the fake buffer 113 on the storage device 110, but the present disclosure is not limited to this embodiment. In some embodiments, the memory allocator 130 can be the third algorithm 135A (such as a RXX dvrMemory Manager algorithm, as shown in FIG. 2), and the third algorithm 135A (such as the RXX dvrMemory Manager algorithm) can be the software which is developed by the RXX semiconductor company and based on the Linux operating system, but the present disclosure is not limited to this embodiment.

In one embodiment, please refer to step 302, the processor 130 generates the fake buffer 113 in the fake capacity of the storage device 110 by the fake buffer algorithm. For example, the fake buffer algorithm can be the first algorithm 131A (such as a Linux kernel algorithm, as shown in FIG. 2), the fake capacity can be in the fake address space, and the fake buffer 113 can be the sparse memory block 113. In other words, the processor 130 can register the sparse memory block 113 in the first algorithm 131A (such as the Linux kernel algorithm), but the present disclosure is not limited to this embodiment.

In some embodiments, the total capacity of the storage device 110 can be 4 GB, the real buffer 111 can be the Buffer 1, the fake buffer 113 can be the Buffer 2, and the Buffer 2 can be the sparse memory block 113. The processor 130 can generate the fake address space in the storage device 110 by the fake buffer algorithm, the Buffer 1 can use 0~4 GB area of storage device 110, and the sparse memory block 113 uses 4~5 GB area (for the storage device 110, the 4~5 GB area does not actually exist) in the fake address space. However, the sparse memory block 113 has the characteristic of a kernel pages structure, for the second device 910, the sparse memory block 113 can regarded as the physical memory, but the present disclosure is not limited to this embodiment. Therefore, the address conversion system 100 does not need to increase a hardware (for example, the additional memory capacity) or resources for coupling the first device 900 to the second device 910.

In some embodiments, the real buffer 111 can be the Buffer 1, the fake buffer 113 can be the Buffer 2, and a total number of the Buffer 1 and Buffer 2 can be 12 pieces. Of course, the total number of the Buffer 1 and Buffer 2 can be more or less, but the present disclosure is not limited to this embodiment.

In one embodiment, please refer to step 303, establishing the coupling relationship between the real buffer 111 and the fake buffer 113 through the coupling algorithm by the coupler 121 of the memory bus 120. For example, the memory bus 120 can include the coupler 121, and the coupler 121 can couple the first address of the real buffer 111 to the second address of the fake buffer 113 by the coupling algorithm, but the present disclosure is not limited to this embodiment.

In one embodiment, please refer to step 304, receiving the compressed data from the first device 900 by the real buffer 111. For example, the first device 900 can be an In-house IP 900, the In-house IP 900 can output the compressed data, and the compressed data can be written to the real buffer 111, but the present disclosure is not limited to this embodiment.

In one embodiment, please refer to step 305, when the second device 910 wants to read the fake buffer 113, the coupler 121 guides the second device 910 to the real buffer 111 through the coupling relationship for reading. For example, the second device 910 can be a Vendor IP 910, and memory bus 120 can include the coupler 121. When the Vendor IP 910 wants to read the fake buffer 113, the coupler 121 can guide the Vendor IP 910 to the real buffer 111 through the coupling relationship for reading, but the present disclosure is not limited to this embodiment.

In one embodiment, please refer to step 306, transmitting the compressed data of the real buffer 111 to the coupler 121 by the memory bus 120. In one embodiment, please refer to step 307, decompressing the compressed data into the decompressed data by the coupler 121. In one embodiment, please refer to step 308, transmitting the decompressed data to the second device by the memory bus 120. For example, the real buffer 111 can transmit the compressed data to the coupler 121, after the coupler 121 receiving the compressed data, the coupler 121 can decompress the compressed data into the decompressed data. Then, the memory bus 120 transmits the decompressed data to the second device 910, but the present disclosure is not limited to this embodiment.

Figure 4:
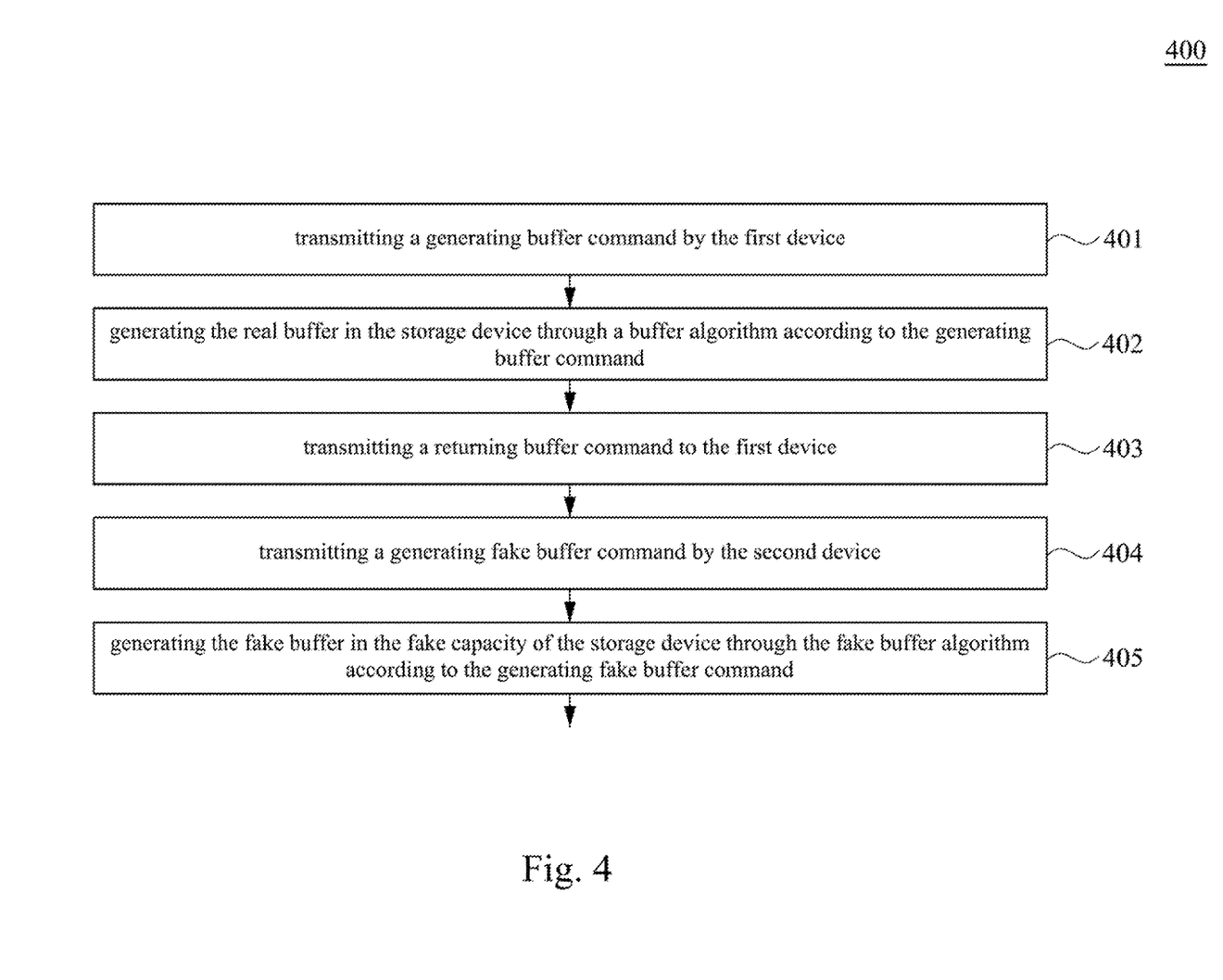
FIGS. 4–6 are flowcharts of an address conversion method according to another embodiment of the present disclosure.
Figure 5:
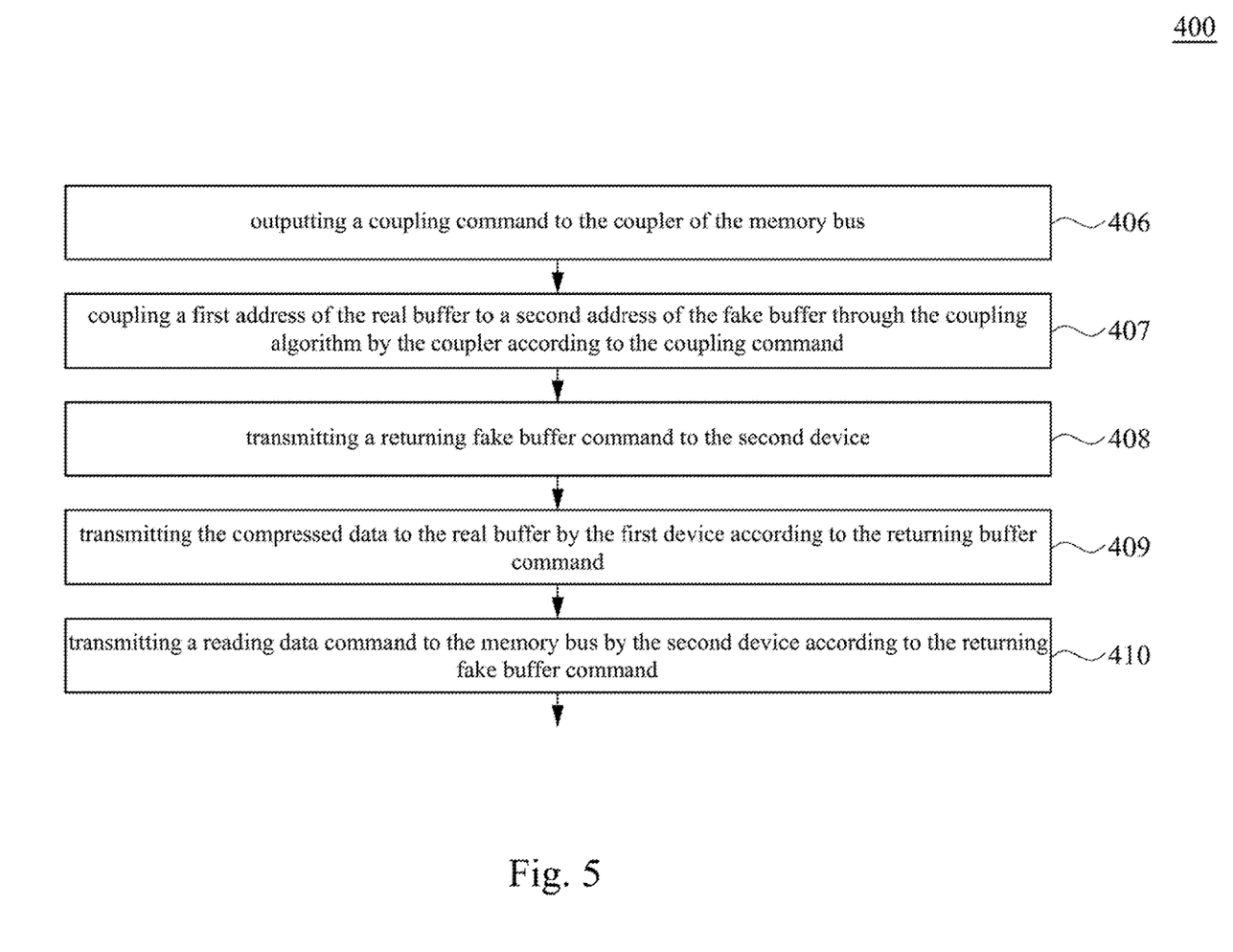
Figure 6:
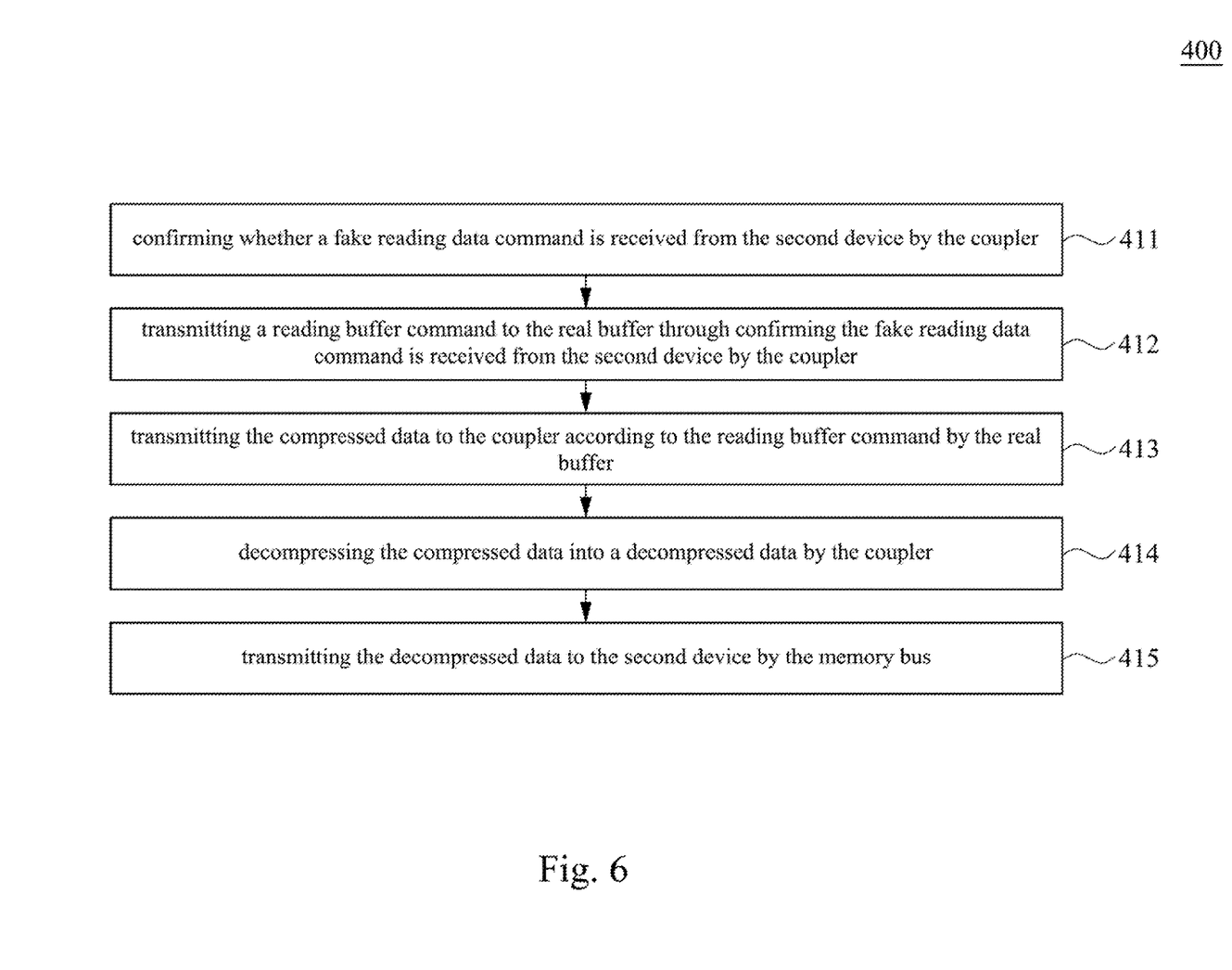

FIGS. 4~6 are flowcharts of an address conversion method according to another embodiment of the present disclosure. In order to make the address conversion method 400 of FIGS. 4~6 easier to understand, please refer to FIG. 1, FIG. 2, FIGS. 4~6 together. The address conversion method 400 of FIGS. 4~6 include the following steps:

Step 401: transmitting a generating buffer command by the first device 900;

Step 402: generating the real buffer 111 in the storage device 110 through a buffer algorithm according to the generating buffer command; Step 403: transmitting a returning buffer command to the first device 900;

Step 404: transmitting a generating fake buffer command by the second device 910;

Step 405: generating the fake buffer 113 in the fake capacity of the storage device 110 through the fake buffer algorithm according to the generating fake buffer command;

Step 406: outputting a coupling command to the coupler 121 of the memory bus 120;

Step 407: coupling a first address of the real buffer 111 to a second address of the fake buffer 113 through the coupling algorithm by the coupler 121 according to the coupling command;

Step 408: transmitting a returning fake buffer command to the second device 910;

Step 409: transmitting the compressed data to the real buffer 111 by the first device 900 according to the returning buffer command;

Step 410: transmitting a reading data command to the memory bus 120 by the second device 910 according to the returning fake buffer command;

Step 411: confirming whether a fake reading data command is received from the second device 910 by the coupler 121;

Step 412: transmitting a reading buffer command to the real buffer 111 through confirming the fake reading data command is received from the second device 910 by the coupler 121;

Step 413: transmitting the compressed data to the coupler 121 according to the reading buffer command by the real buffer 111;

Step 414: decompressing the compressed data into a decompressed data by the coupler 121;

Step 415: transmitting the decompressed data to the second device 910 by the memory bus 120.

In one embodiment, please refer to step 301, step 401, and step 402, the step of the processor 130 generates the real buffer 111 on the storage device 110 includes the following steps: transmitting the generating buffer command by the first device 900; and the processor 130 generates the real buffer 111 in the storage device 110 through the buffer algorithm according to the generating buffer command. For example, the real buffer 111 can be the Buffer 1, the generating buffer command can be the request output Buffer command, but the present disclosure is not limited to this embodiment.

In one embodiment, please refer to step 301, step 403, and step 404, the step of the processor 130 generates the real buffer 111 on the storage device 110 further includes the following steps: the processor 130 transmits the returning buffer command to the first device 900; and transmitting a generating fake buffer command by the second device 910. For example, the returning buffer command can be the return Buffer 1 command, the generating fake buffer command can be the request input Buffer command, but the present disclosure is not limited to this embodiment.

In one embodiment, please refer to step 302 and step 405, the step of the processor 130 generates the fake buffer 113 in the fake capacity of the storage device 110 by the fake buffer algorithm includes the following steps: the processor 130 generates the fake buffer 113 in the fake capacity of the storage device 110 through the fake buffer algorithm according to the generating fake buffer command. For example, the processor 130 can generate the fake buffer 113 (such as the Buffer 2) in the fake capacity (such as the fake address space) of the storage device 110 through the fake buffer algorithm (such as the Linux kernel algorithm) according to the generating fake buffer command (such as the request input Buffer command), but the present disclosure is not limited to this embodiment.

In one embodiment, please refer to step 303, step 406, and step 407, the step of establishing the coupling relationship between the real buffer 111 and the fake buffer 113 through the coupling algorithm by the coupler 121 of the memory bus 120 includes the following steps: the processor 130 outputs the coupling command to the coupler 121 of the memory bus 120; and coupling the first address of the real buffer 111 to the second address of the fake buffer 113 through the coupling algorithm by the coupler 121 according to the coupling command. For example, the coupling command can be the allocate fake Buffer 2 command, the coupling command writes to the coupler 121 (such as the MonitorWrapper 121) of the memory bus 120, and the coupler 121 is configured to map, bind, or couple the second address of the fake buffer 113 (such as the Buffer 2) to the first address of the real buffer 111 (such as the Buffer 1), but the present disclosure is not limited to this embodiment.

In some embodiments, the coupling algorithm is configured to inspect the address (such as the read address) of the second device 910 in real-time by the coupler 121. When the read address is located on the second address (for example, the second address is between the start address and the end address of the second buffer (such as the Buffer 2) of the fake buffer 113, the first translator (such as the Level-0 address translator) is performed on the read address to translate the read address to the corresponding address (such as a Buffer1_read_address) of the Buffer 1.

Then, the second translator (such as the Level-1 translator) is performed on the Buffer1_read_address to obtain the corresponding data offset (such as the Buffer1_offset_address) and first cache (such as the header cache) of the Buffer 1. In addition, the first cache (such as the header cache) can generate the second cache (such as the Decompressor/data cache).

Afterward, after the interface (such as the DDR interface) of the storage device 110 receives the Buffer1_offset_address and the Decompressor/data cache, the DDR interface drives the coupler 121 to decompress the compressed data of the first device 900 (such as the in-house IP) into the decompressed data. Then, the coupler 121 transmits the decompressed data to the second device 910 (such as the Vendor IP), but the present disclosure is not limited to this embodiment.

In one embodiment, please refer to step 303 and step 408, the step of establishing the coupling relationship between the real buffer 111 and the fake buffer 113 through the coupling algorithm by the coupler 121 of the memory bus 120 further includes the following steps: the processor 130 transmits the returning fake buffer command to the second device 910. For example, the returning fake buffer command can be the return Buffer 2 command, but the present disclosure is not limited to this embodiment.

In one embodiment, please refer to step 304 and step 409, the step of receiving the compressed data from the first device 900 by the real buffer 111 includes the following steps: transmitting a reading data command to the memory bus 120 by the second device 910 according to the returning fake buffer command. For example, the first device 900 can transmit the compressed data to the Buffer 1 according to the return Buffer 1 command, but the present disclosure is not limited to this embodiment.

In one embodiment, please refer to step 305, step 410, and step 411, the step of when the second device 910 wants to read the fake buffer 113, the coupler 121 guides the second device 910 to the real buffer 111 through the coupling relationship for reading includes following steps: transmitting the reading data command to the memory bus 120 by the second device 910 according to the returning fake buffer command; and confirming whether the fake reading data command is received from the second device 910 by the coupler 121.

For example, the reading data command can be the read data from Buffer 2 command, the fake reading data command can be the faked read trigger command, and the second device 910 can transmit the read data from Buffer 2 command to the memory bus 120 according to the return Buffer 2 command. The coupler 121 can further identify whether the read data from Buffer 2 command output from the second device 910 is the faked read trigger command, but the present disclosure is not limited to this embodiment.

In one embodiment, please refer to step 306, step 412, and step 413, the step of transmitting the compressed data of the real buffer 111 to the coupler 121 by the memory bus 120 includes the following steps: transmitting the reading buffer command to the real buffer 111 when it is confirmed that the fake reading data command is received from the second device 910 by the coupler 121; and transmitting the compressed data to the coupler 121 according to the reading buffer command by the real buffer 111.

For example, the reading buffer command can be the request read from Buffer 1 command, the coupler 121 can identify the read data from Buffer 2 command outputted from the second device 910 is the faked read trigger command, and the coupler 121 can then transmit the request read from Buffer 1 command to the real buffer 111. The real buffer 111 transmits the compressed data to the coupler 121 according to the reading buffer command, but the present disclosure is not limited to this embodiment.

In one embodiment, please refer to step 307 and step 414, decompressing the compressed data into a decompressed data by the coupler 121. In one embodiment, please refer to step 307 and step 415, transmitting the decompressed data to the second device 910 by the memory bus 120. For example, after the coupler 121 receiving the compressed data, the coupler 121 can decompress the compressed data into the decompressed data. Then, the memory bus 120 transmits the decompressed data to the second device 910, but the present disclosure is not limited to this embodiment.

In some embodiments, the fake buffer algorithm includes the Linux algorithm, and the coupler 121 includes the decompressor. For example, the fake buffer algorithm can be the algorithm technique associated with the first algorithm 131A (such as the Linux kernel, as shown in FIG. 2), the decompressor can be the decompressor on any entity or software, and the coupler 121 can include the MonitorWrapper and the decompressor, but the present disclosure is not limited to this embodiment.

It can be seen from the above embodiments of the present disclosure that the application of the present disclosure has the following advantages. The address conversion system and the address conversion method shown in the embodiment of the present disclosure can reduce the consumption of resources in the memory, so as to achieve the effect of transferring data between two pieces of hardware with different addresses.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An address conversion system, comprising:
a storage device;
a memory bus, comprising:
a coupler, configured to couple a first device to a second device; and
a processor, configured to access and execute a plurality of commands of the storage device to:
generate a real buffer in the storage device;
generate a fake buffer in a fake capacity of the storage device by a fake buffer algorithm;
establish a coupling relationship between the real buffer and the fake buffer through a coupling algorithm by the coupler of the memory bus;
receive a compressed data from the first device by the real buffer;
when the second device wants to read the fake buffer, the coupler guides the second device to the real buffer through the coupling relationship for reading;
transmit the compressed data of the real buffer to the coupler by the memory bus;
decompress the compressed data into a decompressed data by the coupler; and
transmit the decompressed data to the second device by the memory bus.

2. The address conversion system of claim 1, wherein the processor is further configured to access and execute the plurality of commands of the storage device to:
transmit a generating buffer command by the first device; and
generate the real buffer in the storage device through a buffer algorithm according to the generating buffer command.

3. The address conversion system of claim 2, wherein the processor is further configured to access and execute the plurality of commands of the storage device to:
transmit a returning buffer command to the first device; and
transmit a generating fake buffer command by the second device.

4. The address conversion system of claim 3, wherein the processor is further configured to access and execute the plurality of commands of the storage device to:
generate the fake buffer in the fake capacity of the storage device through the fake buffer algorithm according to the generating fake buffer command.

5. The address conversion system of claim 4, wherein the processor is further configured to access and execute the plurality of commands of the storage device to:
output a coupling command to the coupler of the memory bus; and
couple a first address of the real buffer to a second address of the fake buffer through the coupling algorithm by the coupler according to the coupling command.

6. The address conversion system of claim 5, wherein the processor is further configured to access and execute the plurality of commands of the storage device to:
transmit a returning fake buffer command to the second device.

7. The address conversion system of claim 6, wherein the processor is further configured to access and execute the plurality of commands of the storage device to:
transmit the compressed data to the real buffer by the first device according to the returning buffer command.

8. The address conversion system of claim 7, wherein the processor is further configured to access and execute the plurality of commands of the storage device to:
transmit a reading data command to the memory bus by the second device according to the returning fake buffer command; and
confirm whether a fake reading data command is received from the second device by the coupler.

9. The address conversion system of claim 8, wherein the processor is further configured to access and execute the plurality of commands of the storage device to:
transmit a reading buffer command to the real buffer when it is confirmed that the fake reading data command is received from the second device by the coupler; and
transmit the compressed data to the coupler according to the reading buffer command by the real buffer.

10. The address conversion system of claim 1, wherein the fake buffer algorithm comprises a Linux algorithm, wherein the coupler comprises a decompressor.

11. An address conversion method, comprising:
generating a real buffer in a storage device;
generating a fake buffer in a fake capacity of the storage device by a fake buffer algorithm;
establishing a coupling relationship between the real buffer and the fake buffer through a coupling algorithm by a coupler of a memory bus;
receiving a compressed data from a first device by the real buffer;
when a second device wants to read the fake buffer, the coupler guides the second device to the real buffer through the coupling relationship for reading;
transmitting the compressed data of the real buffer to the coupler by the memory bus;
decompressing the compressed data into a decompressed data by the coupler; and
transmitting the decompressed data to the second device by the memory bus.

12. The address conversion method of claim 11, wherein generating the real buffer on the storage device comprises:
transmitting a generating buffer command by the first device; and generating the real buffer in the storage device through a buffer algorithm according to the generating buffer command.

13. The address conversion method of claim 12, wherein generating the real buffer on the storage device further comprises:
   transmitting a returning buffer command to the first device; and
   transmitting a generating fake buffer command by the second device.

14. The address conversion method of claim 13, wherein generating the fake buffer in the fake capacity of the storage device by the fake buffer algorithm comprises:
   generating the fake buffer in the fake capacity of the storage device through the fake buffer algorithm according to the generating fake buffer command.

15. The address conversion method of claim 14, wherein establishing the coupling relationship between the real buffer and the fake buffer through the coupling algorithm by the coupler of the memory bus comprises:
   outputting a coupling command to the coupler of the memory bus; and
   coupling a first address of the real buffer to a second address of the fake buffer through the coupling algorithm by the coupler according to the coupling command.

16. The address conversion method of claim 15, wherein establishing the coupling relationship between the real buffer and the fake buffer through the coupling algorithm by the coupler of the memory bus further comprises:
   transmitting a returning fake buffer command to the second device.

17. The address conversion method of claim 16, wherein receiving the compressed data from the first device by the real buffer comprises:
   transmitting the compressed data to the real buffer by the first device according to the returning buffer command.

18. The address conversion method of claim 17, wherein when the second device wants to read the fake buffer, the coupler guides the second device to the real buffer through the coupling relationship for reading comprises:
   transmitting a reading data command to the memory bus by the second device according to the returning fake buffer command; and
   confirming whether a fake reading data command is received from the second device by the coupler.

19. The address conversion method of claim 18, wherein transmitting the compressed data of the real buffer to the coupler by the memory bus comprises:
   transmitting a reading buffer command to the real buffer when it is confirmed that the fake reading data command is received from the second device by the coupler; and
   transmitting the compressed data to the coupler according to the reading buffer command by the real buffer.

20. The address conversion method of claim 11, wherein the fake buffer algorithm comprises a Linux algorithm, wherein the coupler comprises a decompressor.

* * * * *